United States Patent Office 2,918,401
Patented Dec. 22, 1959

2,918,401

TREATMENT OF NEMATODES WITH QUATERNARY AMMONIUM COMPOUNDS

Frederick Charles Copp, London, England, assignor to Burroughs Wellcome & Co. (U.S.A.) Inc., Tuckahoe, N.Y., a corporation of New York No Drawing. Application March 21, 1957
Serial No. 647,487

Claims priority, application Great Britain March 29, 1956

4 Claims. (Cl. 167—30)

The present invention relates to quaternary ammonium compounds and the preparation thereof.

It has been found that compounds of the general formula (I) are active against nematodes closely associated with the mucosa of the lumen, examples of which are the trichostrongyles in sheep and cattle, parasites of considerable economic importance. The activity of the compounds of Formula I has been established by screening tests carried out against Nippostrongylus muris in the rat. The compounds also exhibit activity against the intestinal parasites Aspiculuris tetraptera and Nematospiroides dubius in mice.

When administered to sheep, activity of various members of the series has been found against the parasitic organisms Nematodirus sp., Ostertagia circumcincta, O. trifurcata, Cooperia curticei and Trichostrongylus axei. The activity against the first four parasites is important as against these certain preparations of phenothiazine frequently used in verterinary medicine have a low efficiency.

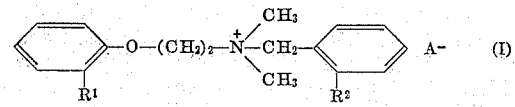

In this formula, $R^1$ is hydrogen, chlorine, bromine or a methyl or nitro group, $R^2$ is hydrogen, chlorine, bromine, fluorine or a methyl group, and $A^-$ is an anion of a non toxic acid such as chloride, bromide, iodide or methosulphate.

The activity of these compounds is closely related to the structure defined, and variants outside the general Formula I are found to give toxicity or lack of activity. Thus if $R^1$ or $R^2$ are alkoxy groups or alkyl higher than methyl, the activity disappears. The same result is obtained by substitution of the benzene rings in the meta or para positions. Certain compounds closely related structurally to those defined in Formula I have already been described in the literature, but such compounds have all been found to be inactive for the present purposes or to be too toxic for administration at therapeutic levels.

According to the present invention in one aspect, therefore, there are provided compounds of the general Formula I.

The invention also involves a process for the treatment of animals such as sheep and cattle which comprises the therapeutic administration of a compound of the general Formula I. The estimated effective dosage of the compounds comprised within the above general formula is approximately from 100 mg./kg. to 1000 mg./kg. in a single dose or in repeated daily doses.

The compounds of the present invention may be prepared by quaternisation of a tertiary amine (II) with one mol. (or small excess) of a methylating agent such as methyl iodide or dimethyl sulphate. They may also be prepared by reaction of a secondary amine (III) with two or more mols. of the methylating agent in presence of an acid binding agent such as sodium carbonate. It will be understood that this reaction proceeds with the intermediate formation of the tertiary amine (II) and therefore amounts to the concurrent preparation of this amine and its quaternisation. Both these reactions may be effected in a suitable solvent, such as acetone or methanol, which does not enter into the reaction.

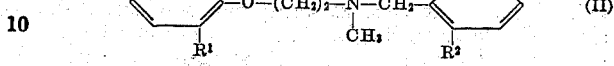

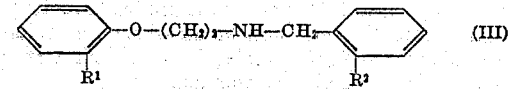

Alternative methods of synthesis are indicated by the routes outlined below:

(i)

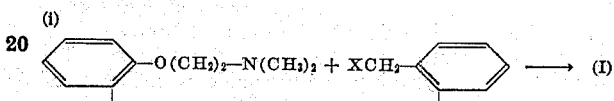

(ii)

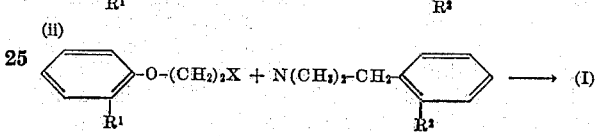

In these formulae X is a suitable reactive grouping such as halogen (for example chlorine, bromine or iodine) or methosulphate.

Reaction (i) may be assisted by the presence of potassium iodide, when the desired quaternary compound (I) is usually isolated as the iodide. Both reactions (i) and (ii) can be conveniently effected in a suitable solvent such as benzene. The former reaction proceeds readily but the latter requires heating for prolonged periods; it may also be effected by heating the reactants together without a solvent. Thus the process comprises reacting in known manner a tertiary amine containing three of the desired groupings in the final quaternary ammonium compound with a suitable quaternising derivative of the fourth grouping. If desired the resulting salt may be converted in the usual manner into the salt of another anion.

It has also been found that the toxic effects of these compounds upon the host are much reduced when they are administered as salts which are sparingly soluble in water, though such derivatives still retain their anthelmintic properties, particularly in larger animals such as sheep.

The present invention in a further aspect therefore comprises a salt of the general Formula I which is sparingly soluble in water.

Particularly useful in this respect have been the salts of the above general formula in which two cations falling within the cationic structure shown in Formula I are combined with one divalent anion of embonic acid, namely 2:2'-dihydroxy-1:1' - dinaphthylmethane - 3:3'-dicarboxylic acid (see Barber and Gaimster, Journal of Applied Chemistry, 1952, vol. 2, page 565).

The present invention in another aspect comprises the embonate of the general Formula II:

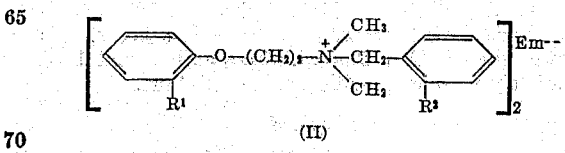

in which $Em^{--}$ is the divalent anion of embonic acid.

Other useful water-insoluble salts comprise the naphthalene-1- and -2-sulphonates and the 2-hydroxy-3-naphthoates.

Such salts are conveniently prepared, according to a feature of the present invention, by reacting in aqueous solution a soluble salt of Formula I with a water soluble salt of the appropriate acid (for example disodium embonate). The reagents are preferably used in equivalent proportions. The desired insoluble salt is thereby precipitated from solution and collected in the usual way.

The compounds of the present invention may be presented in various pharmaceutical preparations, such as tablets, suppositories, capsules, or (where the compound is insoluble) as an aqueous suspension containing if desired suitable suspending agents. Pharmaceutical preparations containing the above defined quaternary ammonium salts also form part of the present invention.

The invention will now be described with reference to the accompanying examples in which all temperatures are given in degrees centigrade.

Example 1

2-phenoxyethyl bromide (30 g.) was added to a solution of benzylamine (50 g.) in benzene (50 ml.) and the mixture was heated on a steam-bath for 5 hours. The precipitated benzylamine hydrobromide was filtered off and washed with fresh benzene and the combined filtrate and washings were shaken with aqueous 4 N sodium hydroxide. The aqueous layer was removed, the benzene layer was dried over solid potassium hydroxide, filtered, and evaporated and the residue was distilled in vacuo. 1-benzylamino-2-phenoxyethane resulted as a colourless oil, boiling point 150–154°/0.3 mm.

This base (4 g.) was dissolved in methanol (5 ml.) and finely powdered anhydrous sodium carbonate (5.3 g.) and methyl iodide (14.5 g.) were added. After heating to reflux for 30 minutes, the mixture was filtered and ether was slowly added to the filtrate. N-benzyl-N:N-dimethyl-N-2-phenoxyethylammonium iodide separated as colourless crystals, melting point 146–147°.

Example 2

1-benzylamino-2-phenoxyethane (23 g.) was slowly added to a cooled mixture of anhydrous formic acid (12 g.) and aqueous formaldehyde (37%; 9.5 ml.). When heated on a steam-bath, there was a rapid evolution of gas. The heating was continued for 14 hours, the solution was then cooled, concentrated hydrochloric acid (15 ml.) was added and the mixture was evaporated in vacuo. The residue was dissolved in water, excess ammonia was added and the precipitated oil was extracted with ether. The ethereal extract was dried over solid potassium hydroxide, filtered and evaporated and the residual 1-(N-benzyl-N-methylamino)-2-phenoxyethane was distilled in vacuo, boiling point 116–122°/0.04 mm.

Dimethyl sulphate (3 g.) was added to a solution of this base (5 g.) in acetone (10 ml.). The mixture warmed spontaneously and N-benzyl-N:N-dimethyl-N-2-phenoxyethylammonium methylsulphate crystallised, melting point 102°. When methyl iodide (3.7 g.) was used in place of the dimethyl sulphate, the corresponding iodide resulted; it was identical with the product described in Example 1.

Example 3

Benzyl chloride (10 g.) was added to a solution of 1-dimethylamino-2-phenoxyethane (12.3 g.) in acetone (35 ml.). The mixture warmed spontaneously and N-benzyl - N:N - dimethyl - N - 2 - phenoxyethylammonium chloride slowly crystallised. After 24 hours, this solid was filtered off, washed with fresh acetone and dried immediately in vacuo, melting point 135–136°.

Example 4

A solution of 2-phenoxyethyl bromide (10.0 g.) and N:N-dimethylbenzylamine (6.8 g.) in benzene (10 ml.) was heated on a steam-bath for 40 hours. An oil slowly separated and subsequently crystallised. After cooling this solid was filtered off, washed with fresh benzene and recrystallised from a mixture of propan-2-ol and ethyl acetate. N - benzyl - N:N - dimethyl - N - 2 - phenoxyethylammonium bromide was obtained as a colourless solid, melting point 144.5–146°.

This product also resulted when the same reactants were heated together without a solvent at 120° for 2 hours. At the end of this time a semi-solid mass had been formed from which the pure bromide resulted on crystallisation from propan-2-ol and ethyl acetate.

Example 5

By a process similar to that described in Example 1, 1 - o - methylbenzylamino - 2 - phenoxyethane was prepared from 2-phenoxyethyl bromide and o-methylbenzylamine and converted by the process of Example 2 into 1 - (N - methyl - N - o - methylbenzylamino) - 2 - phenoxyethane, boiling point 128°/0.06 mm. This base reacted smoothly with methyl iodide in acetone solution to give N:N-dimethyl-N-o-methylbenzyl-N-2-phenoxyethylammonium iodide, melting point 144–145°.

Example 6

1 - benzylamino - 2 - o - methylphenoxyethane, boiling point 200–204°/19 mm., was similarly prepared from 2-o-methylphenoxyethyl bromide and benzylamine and converted into 1-(N-benzyl-N-methylamino)-2-o-methylphenoxyethane, boiling point 198°/16 mm. With methyl iodide this base gave N-benzyl-N:N-dimethyl-N-(2-o-methylphenoxyethyl) ammonium iodide, melting point 153–154°.

Example 7

1 - o - methylbenzylamino - 2 - o - methylphenoxyethane, boiling point 144–148°/0.3 mm. was similarly prepared from 2- o-methylphenoxyethyl bromide and o-methylbenzylamine and converted into 1-(N-methyl-N-o-methylbenzylamino)-2-o-methylphenoxyethane, boiling point 138–140°/0.1 mm. With methyl iodide this base gave N:N - dimethyl - N - o - methylbenzyl - N - (2 - o - methylphenoxyethyl) ammonium iodide, melting point 182–183°.

Example 8

1 - benzylamino - 2 - o - chlorophenoxyethane, boiling point 138–144°/0.05 mm. was similarly prepared from benzylamine and 2-o-chlorophenoxyethyl bromide and converted into 1-(N-benzyl-N-methylamino)-2-o-chlorophenoxyethane boiling point 144–148°/0.07 mm. With methyl iodide this base gave N-benzyl-N-(2-o-chlorophenoxyethyl)-N:N-dimethylammonium iodide, melting point 119–120°.

Example 9

1-o-chlorophenoxy-2-o-methylbenzylaminoethane, boiling point 146–150°/0.1 mm., was similarly prepared from 2-o-chlorophenoxyethyl bromide and o-methylbenzylamine and converted into 1-o-chlorophenoxy-2-(N-methyl - N - o-methylbenzylamino)ethane, boiling point 146–150°/0.2 mm. With methyl iodide this base gave N-(2-o-chlorophenoxyethyl) - N:N - dimethyl-N-o-methylbenzyl ammonium iodide, melting point 166–167°.

Example 10 o-Chlorobenzyl bromide (7.5 g.) and potassium iodide (6 g.) were added to a solution of 1-dimethylamino-2-phenoxyethane (4.5 g.) in methanol. The mixture was heated to reflux for 30 minutes and filtered and ether was added to the filtrate. A rather gummy product separated. This was filtered off and recrystallised from propan-2-ol to give pure N-o-chlorobenzyl-N:N-dimethyl-N-2-phenoxyethylammonium iodide, melting point 122–123°.

Example 11

By processes similar to those described in Example 10, 1-dimethylamino-2-o-methylphenoxyethane was reacted with o-chlorobenzyl bromide in presence of potassium iodide to give N-o-chlorobenzyl-N:N-dimethyl-N-(2-o-methylphenoxyethyl)ammonium iodide. It crystallised from propan-2-ol, melting point 176–177°.

Example 12

A solution of disodium embonate (187 g.) in hot water (2 litres) was slowly added to a stirred solution of N-benzyl - N:N - dimethyl-N-2-phenoxyethylammonium chloride (253 g.) in cold water (800 ml.). At first a clear mixture was formed which rapidly deposited fine crystals as the addition proceeded. After the addition was completed, the mixture was stirred for a further 2 hours, the solid was filtered off, washed with fresh water (200 ml.) and dried in vacuo. The product, di-(N-benzyl-N:N-dimethyl-N-2 - phenoxyethylammonium) embonate monohydrate, was a pale yellow solid, melting point 144–146°.

Example 13

1-dimethylamino-2-o-methylphenoxyethane (358 g.) was dissolved in acetone (1 litre) and benzyl chloride (278 g.) was slowly added with stirring. The mixture became warm and N-benzyl-N:N-dimethyl-N-2-(o-methylphenoxyethyl) ammonium chloride crystallised out. After 72 hours this salt was filtered off, washed with fresh acetone (200 ml.) and dried immediately in vacuo. It melted at 135–138°.

A solution of this chloride (300 g.) in cold water (1 litre) was stirred during the gradual addition of a solution of disodium embonate (212 g.) in hot water (2 litres). As described in Example 12, a solid separated as the addition proceeded. After standing for 2 hours, the solid was filtered off, washed with fresh water (400 ml.) and dried in vacuo. The product was di-[N-benzyl-N:N-dimethyl-N-(2-o - methylphenoxyethyl) ammonium] embonate dihydrate, melting point 68–69°.

Example 14

A solution of sodium naphthalene-2-sulphonate (7.1 g.) in hot water (50 ml.) was slowly added to a solution of N-benzyl-N:N-dimethyl-N-2-phenoxyethylammonium chloride (9 g.) in water (50 ml.) with stirring. An oil separated and then crystallised. After the addition was complete, the mixture was stirred for 2 hours. The insoluble salt was then filtered off, washed with water and dried in vacuo. The resulting N-benzyl-N:N-dimethyl-N-2-phenoxyethylammonium naphthalene-2-sulphonate was a colourless solid. It was recrystallised from a mixture of ethanol and ether and melted at 137–139°.

Example 15

N-benzyl-N:N-dimethyl-N-2 - phenoxyethylammonium naphthalene-1-sulphonate was prepared by the method described in Example 14 using sodium naphthalene-1-sulphonate. It was recrystallised from isopropanol and melted at 128–130°.

Example 16

2-hydroxy-3-naphthoic acid (1.88 g.) was dissolved in hot aqueous sodium hydroxide (0.5 N; 20 ml.) and the resulting solution was slowly added to a solution of N-benzyl-N:N-dimethyl-N-2-phenoxyethylammonium chloride (2.9 g.) in water (5 ml.). A gum separated at first but it solidified on scratching. After the addition was complete, the mixture was allowed to stand at room temperature for 2 hours and then filtered. The residue was washed with water and dried in vacuo to give N-benzyl-N:N-dimethyl-N-2-phenoxyethylammonium 2-hydroxy-3-naphthoate, melting point 170–171°.

Example 17

By processes entirely analogous to those described in Example 3, 1-dimethylamino-2-phenoxyethane was reacted with:

(1) o-Fluorobenzyl bromide to give N-o-fluorobenzyl-N:N-dimethyl - N - 2 - phenoxyethylammonium bromide, melting point 142–144°.

(2) o-Bromobenzyl bromide to give N-o-bromobenzyl-N:N-dimethyl - N - 2 - phenoxyethylammonium bromide, melting point 101–102°.

Example 18

2-o-nitrophenoxyethyl bromide (250 g.) and a 50% solution of dimethylamine in methanol (450 ml.) were reacted together in an autoclave for 2 hours at 80°. The mixture was then evaporated, the residue was basified with excess ammonia and the separated oil was extracted with ether. The residue from evaporation of this ethereal extract was treated with excess 2 N hydrochloric acid, the resulting solution was evaporated to give 1-dimethylamino-2-o-nitrophenoxyethane hydrochloride which was crystallised from ethanol, melting point 174–175°.

This hydrochloride was treated with excess aqueous ammonia to give the free base which was isolated in the usual manner with ether and dissolved in acetone (500 ml.). On the addition of benzyl chloride (115 g.) a reaction took place and N-benzyl-N:N-dimethyl-N-o-nitrophenoxyethylammonium chloride crystallised out. After 72 hours this was filtered off, washed with fresh acetone and dried immediately in vacuo. Because of i:s deliquescent nature, it was dissolved in water (700 ml.) and treated with a solution of potassium iodide (170 g.) in water (200 ml.) to give the corresponding iodide which rapidly crystallised from the aqueous mixture, melting point 140–141°.

I claim:

1. A process for the treatment of nematode infestations which comprises administering to the host of the nematode infested locus quaternary ammonium salts of the general formula

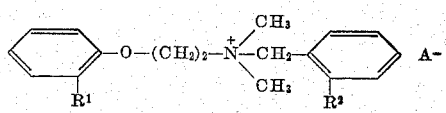

wherein $R^1$ is a radical selected from the class consisting of the methyl and nitro radicals, chlorine, bromine and hydrogen, $R^2$ is a radical selected from the class consisting of the methyl radical, fluorine chlorine, bromine and hydrogen, and $A^-$ is the anion of a non-toxic acid.

2. A process for the treatment of nematode infestations which comprises administering to the host of the nematode infested locus N-benzyl-N:N-dimethyl-N-2-phenoxyethylammonium chloride.

3. A process for the treatment of nematode infestations which comprises administering to the host of the nematode infested locus N-benzyl-N:N-dimethyl-N-2-phenoxyethylammonium bromide.

4. A process for the treatment of nematode infestations which comprises administering to the host of the nematode infested locus a non-toxic acid salt of the N-benzyl-N:N-dimethyl - N - 2 - phenoxyethylammonium cation.

References Cited in the file of this patent

UNITED STATES PATENTS

| 2,336,465 | Buck et al. | Dec. 14, 1943 |
| 2,581,336 | Hartmann et al. | Jan. 8, 1952 |
| 2,734,918 | Barber et al. | Feb. 14, 1956 |

FOREIGN PATENTS

| 672,708 | Great Britain | May 28, 1952 |